(12) United States Patent
Liu et al.

(10) Patent No.: US 6,993,012 B2
(45) Date of Patent: Jan. 31, 2006

(54) METHOD FOR COMMUNICATING AUDIO DATA IN A PACKET SWITCHED NETWORK

(75) Inventors: Fu-Hua Liu, Cupertino, CA (US); Paul Pay-Lun Ju, Cupertino, CA (US); Chen-Huei Chang, Cupertino, CA (US)

(73) Assignee: Innomedia PTE, LTD, Singapore (SG)

( * ) Notice: Subject to any disclaimer, the term of this patent is extended or adjusted under 35 U.S.C. 154(b) by 1256 days.

(21) Appl. No.: 09/788,865

(22) Filed: Feb. 20, 2001

(65) Prior Publication Data

US 2002/0114319 A1 Aug. 22, 2002

(51) Int. Cl.
*H04L 12/66* (2006.01)

(52) U.S. Cl. ...................................... 370/352; 370/389
(58) Field of Classification Search ........ 370/352–358, 370/395.3, 395.2, 389, 494, 495
See application file for complete search history.

(56) References Cited

U.S. PATENT DOCUMENTS

| | | | |
|---|---|---|---|
| 5,799,068 A | 8/1998 | Kikinis et al. | |
| 5,916,302 A | 6/1999 | Dunn et al. | |
| 6,058,431 A | * 5/2000 | Srisuresh et al. | ........... 709/245 |
| 6,075,783 A | 6/2000 | Voit | |
| 6,321,253 B1 | 11/2001 | McKeen et al. | |
| 6,760,780 B1 | * 7/2004 | Chitturi et al. | ............. 709/248 |

FOREIGN PATENT DOCUMENTS

| | | |
|---|---|---|
| EP | 0781015 A | 6/1997 |
| EP | 0841831 A | 5/1998 |
| EP | 0966 145 A | 12/1999 |

OTHER PUBLICATIONS

Alan B. Johnston, SIP, Understanding the Session Initiation Protocol, 2001, pp. 0-52.

* cited by examiner

*Primary Examiner*—Wellington Chin
*Assistant Examiner*—Brenda Pham
(74) *Attorney, Agent, or Firm*—Timothy P. OHagan

(57) ABSTRACT

A method of audio communication between a first telephony client located behind a network address translation (NAT) server and a remote second telephony client is disclosed. A calibration datagram is sent from the first telephony client to the second telephony client on a user datagram protocol (UDP) channel identified for sending audio data. The second telephony client extracts the source address and port number to identify a reverse UDP channel for sending audio data to the first telephony client.

15 Claims, 6 Drawing Sheets

| Client Source | | Translated Source | | Destination | |
|---|---|---|---|---|---|
| IP Address | Port # | IP Address | Port # | IP Address | Port # |
|  |  |  |  |  |  | ← 32(a)
|  |  |  |  |  |  | ← 32(b)
|  |  |  |  |  |  | ← 32(c)
|  |  |  |  |  |  | ← 32(d)
|  |  |  |  |  |  | ← 32(e)

Figure 3

METHOD FOR COMMUNICATING AUDIO DATA IN A PACKET SWITCHED NETWORK

TECHNICAL FIELD

The present invention relates to communicating audio data in a packet switched network and, more specifically, to establishing and maintaining Internet telephony communications through a network address translation (NAT) device.

BACKGROUND OF THE INVENTION

For many years voice telephone service was implemented over a circuit switched network commonly known as the public switched telephone network (PSTN) and controlled by a local telephone service provider. In such systems, the analog electrical signals representing the conversation are transmitted between the two telephone handsets on a dedicated twisted pair copper wire circuit. More specifically, each telephone handset is coupled to a local switching station on a dedicated pair of copper wires known as a subscriber loop. When a telephone call is placed, the circuit is completed by dynamically coupling each subscriber loop to a dedicated pair of copper wires between the two switching stations.

More recently, the copper wires, or trunk lines between switching stations have been replaced with fiber optic cables. A computing device digitizes the analog signals and formats the digitized data into frames such that multiple conversations can be transmitted simultaneously on the same fiber. At the receiving end, a computing device reforms the analog signals for transmission on copper wires. Twisted pair copper wires of the subscriber loop are still used to couple the telephone handset to the local switching station.

More recently yet, voice telephone service has been implemented over the Internet. Advances in the speed of Internet data transmissions and Internet bandwidth have made it possible for telephone conversations to be communicated using the Internet's packet switched architecture and the TCP/IP protocol.

Software is available for use on personal computers which enable the two-way transfer of real-time voice information via an Internet data link between two personal computers (each of which is referred to as an end point), each end point computer includes appropriate hardware for driving a microphone and a speaker. Each end point operates simultaneously as both a sender of real time voice data and as a receiver of real time voice data to support a full duplex voice conversation. As a sender of real time voice data, the end point computer converts voice signals from analog format, as detected by the microphone hardware, to digital format. The software then facilitates data compression down to a rate compatible with the end point computer's data connection to an Internet Service Provider (ISP) and facilitates encapsulation of the digitized and compressed voice data into the TCP/IP protocol, with appropriate addressing to permit communication via the Internet.

As a receiver of real time voice data, the end point computer and software reverse the process to recover the analog voice information for presentation to the other party via the speaker associated with the receiving computer.

To promote the wide spread use of internet telephony, the International Telephony Union (ITU) had developed a set of standards for internet telephony. The ITU Q.931 standard relates to call signaling and set up, the ITU H.245 standard provides for negotiation of channel usage and capabilities between the two endpoints, and the ITU H.323 standard provides for real time voice data between the two end points to occur utilizing User Datagram Protocol (UDP) frames to deliver the real time voice data.

A problem associated with standard ITU Internet telephony is that if one of the end points is behind a network address translation (NAT) firewall, data can not be sent on the required inbound UDP channels. More specifically, ITU Internet telephony standards provide for each endpoint to send audio data to the other endpoint on UDP channels negotiated as part of the H.245 messaging. While the endpoint behind the NAT firewall can readily send audio data on an outbound UDP channel, the NAT server will not recognize UDP frames on the inbound UDP channels.

What is needed is a method for communicating audio data frames between two devices, wherein one of the devices is behind a NAT firewall.

SUMMARY OF THE INVENTION

A first aspect of the present invention is to provide a method of audio communication between a first and a second Internet telephony client through a packet switched network. The method comprises establishing a reliable call set up connection between the first telephony client located on a private network and the second telephony client on the Internet.

Utilizing the reliable call set up connection an outbound audio data channel is established between the first telephony client and the second telephony client. The outbound audio data channel is defined by an IP address and logical port number associated with the second telephony client for receiving User Datagram Protocol (UDP) datagrams. The first telephony client then sends an outbound datagram (e.g. calibration datagram) to the second telephony client on the outbound audio data channel.

The second telephony client uses the outbound datagram to identify a reverse audio data channel for sending an inbound datagram from the second telephony client to the first telephony client. More specifically, the second telephony client extracts the source address and logical port number from the outbound datagram to identify the address and logical port number of the reverse audio data channel.

Thereafter, a plurality of datagrams representing audio data can be transferred between the first and second telephony clients. More specifically, datagrams from the first telephony client to the second telephony client are transferred utilizing the outbound audio data channel and datagrams from the second telephony client to the first telephony client are transferred utilizing the reverse audio data channel.

Because the first telephony client is located on a private network and may be behind a network address translation (NAT) server, the step of sending the outbound datagram may include: i) sending a private network outbound datagram with a source address and port number configured to a private network IP address and logical port number associated with the first telephony client for sending UDP datagrams and a destination address and port number configured to the IP address and logical port number associated with the second telephony client for receiving UDP datagrams; ii) routing the private network outbound datagram to a NAT server; iii) translating the source address and port number from the private network IP address and logical port number associated with the first telephony client to an IP address and logical port number associated with the NAT server; and iv) sending an Internet outbound datagram with a source address and port number configured to the translated source address and port number and a destination address and port number configured to the IP address and logical port number associated with the second telephony client for receiving UDP datagrams. Further, the NAT server may store data representing the translation between the private network IP address and logical port number associated with the first telephony client and the IP address and logical port number associated with the translation device in a translation table.

Similarly, the step of sending a datagram representing audio data from the second telephony client to the first telephony client utilizing the reverse channel may include: i) sending an Internet inbound datagram with a destination address and port number configured to the IP address and logical port number associated with the translation device; ii) receiving the Internet inbound datagram at the translation device and utilizing the translation table to map the destination address and port number of the Internet inbound datagram to the private network IP address and port number associated with the first telephony client; and iii) sending a private network inbound datagram with a destination address and port number configured to the private network IP address and port number associated with the first telephony client.

A second aspect of the present invention is to provide method for an initiating Internet telephony client to communicate audio data with a terminating telephony client through a packet switched network. The method comprises establishing a reliable call set up connection with the terminating telephony client.

Utilizing the reliable call set up connection, the initiating telephony client receives data representing the logical port number on which the terminating telephony client will receive UDP datagrams. The initiating telephony clients configures a logical port for both sending and receiving UDP datagrams to the terminating telephony client and sends a UDP calibration datagram to the terminating telephony client utilizing a destination port number configured to the logical port number on which the terminating telephony device will receive UDP datagrams and a source port number configured to the logical port of the initiating telephony client for both sending and receiving UDP datagrams. Thereafter, the initiating telephony client sends and receives UDP datagrams representing an Internet telephony conversation on the logical port configured for both sending and receiving UDP datagrams.

A third aspect of the present invention is to provide method for a terminating telephony client to communicate audio data with an initiating telephony client through a packet switched network. The method comprises establishing a reliable call set up connection with the initiating telephony client.

The terminating telephony client configures a logical port number for both sending and receiving UDP datagrams and, utilizing the reliable call set up connection, sends data to the initiating client representing such logical port number configured for both sending and receiving UDP datagrams. The terminating telephony client then receives a calibration datagram from the initiating telephony client on such logical port number and extracts the source IP address and source port number from the calibration datagram to determine a destination IP address and destination logical port for use in sending UDP datagrams to the initiating telephony client. The terminating telephony client sends a UDP datagram to the initiating telephony client utilizing the destination logical port number as the destination port and utilizing the terminating telephony client's port configured for both sending and receiving UDP datagrams as a source port.

Thereafter, a plurality of UDP datagrams representing audio data may be exchanged with the initiating telephony client on a UDP channel defined by the IP address and port number extracted from the calibration datagram and the terminating telephony client IP address and logical port number configured for both sending and receiving UDP datagrams.

A fourth aspect of the present invention is to provide a method of establishing an Internet telephony session and communicating audio data between a client and a remote client. The method comprises: a) establishing a reliable call set up connection with the remote client; b) determining which one of the remote client and the client initiated the Internet telephony session; c) assigning a first status (e.g. slave status) to the one of the remote client and client determined to have initiated the Internet telephony session; d) assigning a second status (e.g. master status) to the one of the remote client and client not assigned a first status; c) sending data representing a logical port configured for receiving user datagram protocol (UDP) datagrams from the one of the remote client and the client assigned the second (master) status to the one of the remote client and the client assigned the first (slave) status; d) sending a calibration datagram to the logical port configured for receiving UDP datagrams from the one of the remote client and the client assigned the first (slave) status to the one of the remote client and the client assigned the second (master) status; and e) utilizing the calibration datagram to identify a logical port number associated with the one of the remote client and the client assigned the first (slave) status for use sending UDP datagrams from the one of the remote client and the client assigned the second (master) status to the one of the remote client and the client assigned the first status.

Because either the client or the remote client may be on a private network coupled to the Internet through a NAT server, the step of sending the calibration datagram may include: i) sending a private network outbound datagram with a source address and port number configured to a private network IP address and port number from the one of the one of the client and remote client assigned the first (slave) status and a destination address and port number configured to the IP address and port number configured for both sending and receiving UDP datagrams of the one of the one of the client and remote client assigned the second (master) status; ii) routing the private network outbound datagram to a NAT server; iii) translating the source address and port number to an IP address and logical port number associated with the translation device; and iv) sending an Internet outbound datagram with a source address and port number configured to the translated source address and port number to the one of the client and the remote client assigned the second (master) status.

Further, the NAT server may store data representing the translation between the source address and port number of the private network outbound datagram and the translated source address and port number of the Internet outbound datagram in a translation table.

The step of utilizing the calibration datagram to identify a logical port number associated with the one of the remote client and the client assigned the first (slave) status for use sending UDP datagrams from the one of the remote client and the client assigned the second (master) status to the one of the remote client and the client assigned the first (slave) status includes extracting the translated source address and logical port number from the Internet outbound datagram.

BRIEF DESCRIPTION OF THE DRAWINGS

FIG. 3 is a table representing data stored in a translation table of a network address translation server.

DESCRIPTION OF THE PREFERRED EMBODIMENTS

Figure 1:
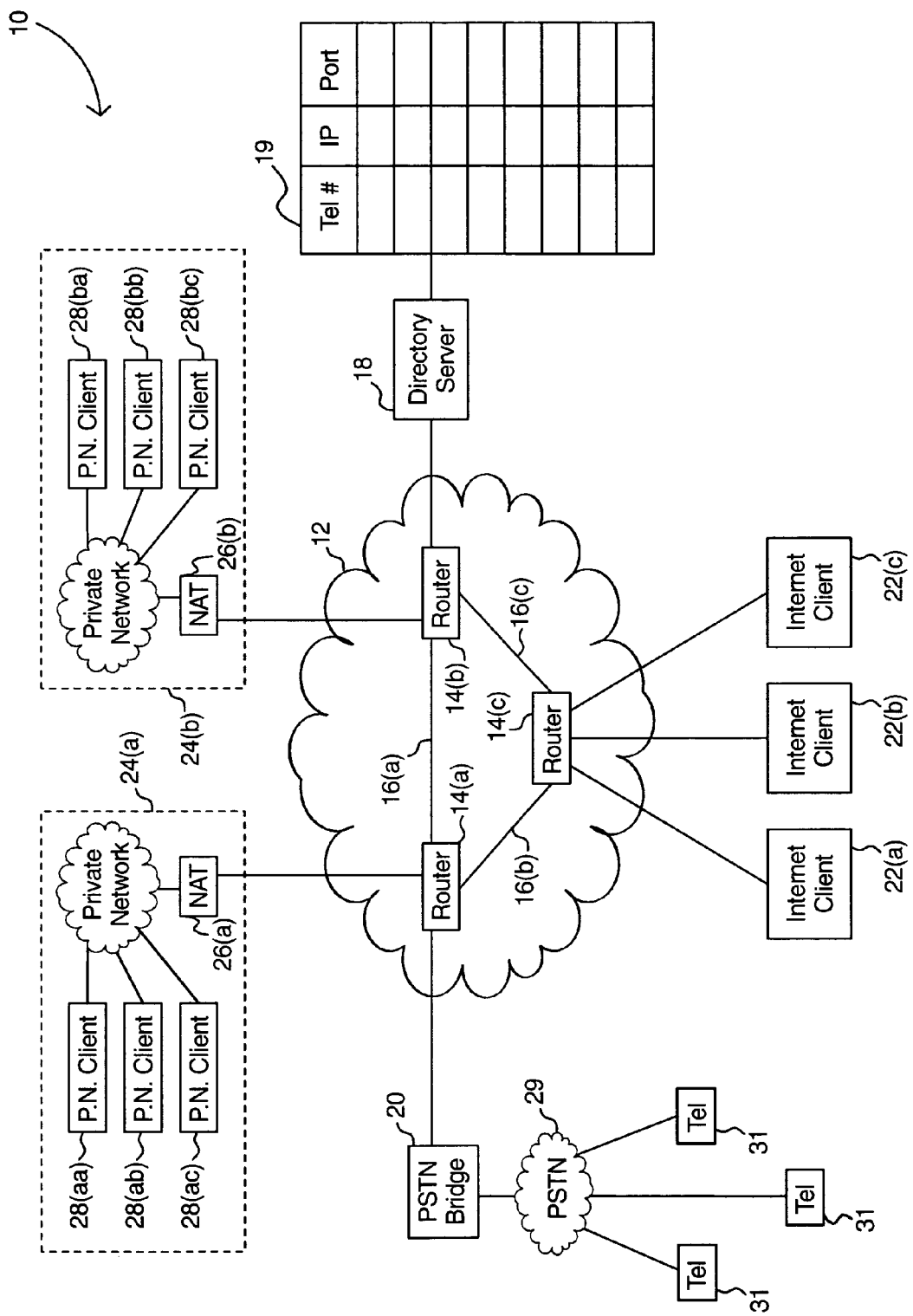
FIG. 1 is a block diagram of packet switched audio communication system utilizing the Internet.

The present invention will now be described in detail with reference to the drawings. In the drawings, like reference numerals are used to refer to like elements throughout.

Network Architecture Overview

FIG. 1 is a block diagram of a packet switched audio communication system 10 utilizing the Internet 12. The Internet 12 includes a plurality of routers 14(a)–14(c) interconnected by high speed data links 16(a)–16(c).

Coupled to the Internet 12, or more specifically coupled to one of the routers 14(a)–14(c), are various computing devices that, for purposes of this invention, include a directory server 18, a PSTN bridge 20, a plurality of Internet telephony clients 22(a)–22(c), and a plurality of private network network address translation (NAT) servers 26(a)–26(b).

The PSTN bridge operates to relay audio data between a device on the Internet 12 and a traditional telephone device 31 coupled to the public switched telephone network (PSTN) 29.

Each of the NAT servers 26(a) and 26(b) couples a private network 24(a) and 24(b) respectively, to one of the Internet 12 routers 14. Private network 24(a) includes a plurality of private network clients 24(aa)–24(ac) couple thereto and private network 24(b) includes a plurality of private network clients 24(ba)–24(bc) coupled thereto.

Each of the computing devices coupled to the Internet 12 is assigned an Internet Protocol (IP) address. Frames of data are communicated between the various devices utilizing each devices IP address for routing the frames from a source device to a destination device. More specifically, a suite of protocols known as TCP/IP enables devices to set up TCP logical connections, and/or UDP logical channels, with each other utilizing each others IP address and logical port numbers for the purpose of exchanging data.

Each of the private networks 24(a) and 24(b) also utilizes the TCP/IP protocols. As such, each private network client 28 is assigned a private network IP address. However, because the NAT server 26 is the only device coupled to the Internet 12, only the NAT server 26 has a "real" IP address, each private network IP address is selected from a block of addresses reserved for private networks. IP frames on the private network 24 are routed to the appropriate device on private network 24 when the destination address is within the block of private network IP addresses. However, IP frames are routed to the NAT server 26 when the terminating IP address is a real IP address on the Internet.

The NAT server 26 emulates the destination device when setting up TCP/IP connections and otherwise exchanging data with the private network client 28 and operates as an IP layer proxy, by performing both address translation and port translation, to exchange data with the destination device on behalf of the private network client 28.

As such, it should be appreciated that each private network client 28 may, exchange data with other devices on the Internet 12 through its associated NAT server 26.

Telephony Clients

Figure 2:
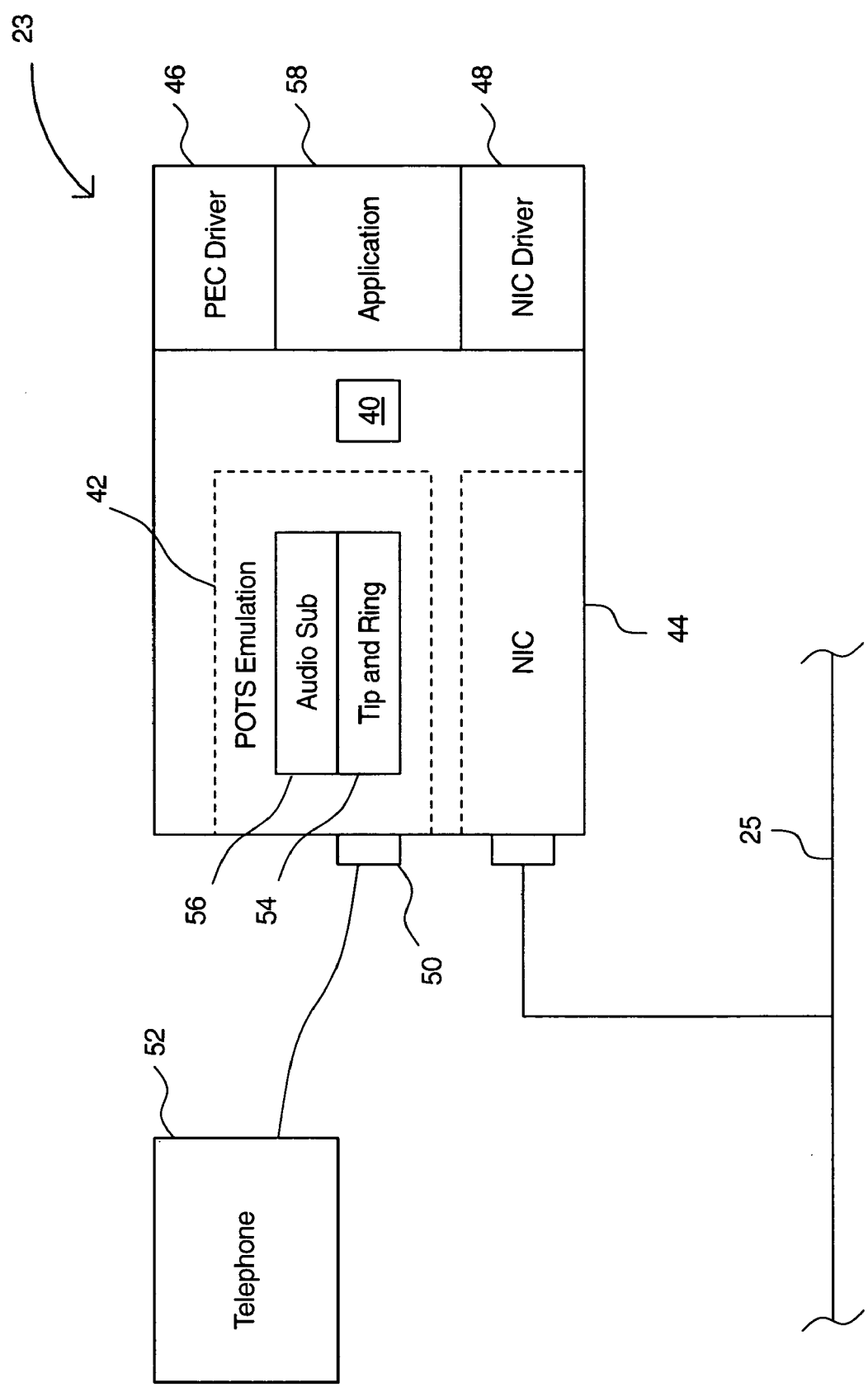
FIG. 2 is a block diagram of an Internet Telephony client in accordance with one aspect of this invention.

Referring briefly to FIG. 2, exemplary structure of a telephony client 23 in accordance with this invention is shown. The telephony client 23 is useful as both an Internet client 22 (FIG. 1) and as a private network client 28 (FIG. 1).

For purposes of this invention, the telephony client 23 may be a desk top computer which includes a processing unit 40 for operating a plain old telephone service (POTS) emulation circuit 42, a network interface circuit 44, a driver 46 for the POTS emulation circuit 42, a driver 48 for the network interface circuit 44, and an internet telephony application 58. Each of the POTS emulation circuit 42 and the network interface circuit 44 may be cards that plug into the computer expansion slots.

The POTS emulation circuit 42 includes an RJ-11 female jack 50 for coupling a traditional POTS telephone handset 52 to the emulation circuit 42. A tip and ring emulation circuit 54 emulates low frequency POTS signals on the tip and ring lines for operating the telephone handset 52. An audio system 56 interfaces the tip and ring emulation circuit 54 with the Internet telephony application 58. More specifically, the audio system 56 operates to digitize audio signals from the microphone in the handset 52 and present the digitized signals to the Internet telephony application 58, and simultaneously, operates to receive digital data representing audio signals from the internet telephony application 58 (representing the voice of the remote caller), convert the data to analog audio data, and present the analog audio data to the tip and ring emulation circuit 54. The tip and ring emulation circuit 54 modulates the tip and ring lines for driving the speaker of the handset 52 in accordance with the analog signal received from the audio system 56.

The network interface circuit 44 and the network interface driver 48 together include the hardware and software circuits for operating the IP protocols and communicating frames of data over the network 25 with other devices coupled thereto.

While the above description of telephony client 23 references a desk top computer, other configurations of a telephony client 23 are envisioned by this invention and include an Internet telephony appliance which operates as a telephone with a network interface and all of the above systems embedded therein.

Peer to Peer Internet Telephony

Referring again to FIG. 1, each Internet client 22 is configured to initiate (e.g. place) and terminate (e.g. receive) peer to peer Internet telephony calls with other Internet clients 22. Such Internet clients 22 are also configured to terminate (e.g. receive) peer to peer Internet telephony calls that are initiated by a private network client 28 through its associated NAT server 26. However, because of NAT server 26 architecture, which will be discussed in more detail herein, Internet clients 22 can not initiate Internet telephony to a private network client 28.

To initiate an Internet telephony call, for example an Internet call initiated by Internet client 22(c) to Internet client 22(a), the initiating Internet client 22(c) establishes a Q.931 TCP/IP connection with the terminating Internet client 22(a). The Q.931 connection is utilized to exchange Q.931 messages which includes opening an H.245 connection between the two clients. The H.245 connection is utilized to exchange H.245 messages which includes establishing both inbound and outbound UDP channels for transferring audio data in full duplex between the initiating Internet client 22(*c*) and the terminating Internet client 22(*a*) to facilitate a normal telephone conversation between the operators. Each UDP channel is defined by the IP address and logical port number of the sending client for sending a UDP datagram and the IP address and logical port number of the receiving client for receiving a UDP datagram.

Human operators are accustomed to working with 10-digit telephone numbers which, once assigned to a person, remain relatively stable. However, each Internet client 22 is addressed via a 12-digit IP address which may change each time the device logs onto an ISP network. As such, the directory server 18 facilitates the establishment of connections between the various clients 22. Each client 22 is assigned a permanent 10 digit telephone number and the directory server 18 includes a database 19 which stores the connection data needed to address the client 22 and updates such connection data each time the address of the client 22 changes. The directory server 18 and the database 19 associate a connection IP address and Q.931 port with each 10-digit telephone number used to identify each client 22.

Utilizing the directory server 18, the initiating Internet client, 22(*c*) in the above example, receives a 10-digit telephone number from the operator. Then, the initiating Internet client 22(*c*) opens a TCP/IP connection with the directory server 18 to determine the connection IP address (and Q.931 port) associated with the terminating Internet client 22(*a*). Utilizing the IP address and Q.931 port number obtained from the directory server 18, the initiating Internet client 22(*c*) is capable of opening the Q.931 connection with the terminating Internet client 22(*a*) without requiring the operator to input an IP address associated with the terminating Internet client 22(*a*).

Private network clients 28 are similarly capable of initiating an Internet telephony call to any one of the Internet clients 22 through its associated private network 24 and NAT server 26.

More specifically, the operator of one of the private network clients, for example private network client 28(*aa*) initiates an Internet telephony call with a terminating Internet client, 22(*c*) for example, by entering the 10 digit telephone number associated with the Internet client 22(*a*). The initiating private network client 28(*aa*) then sends a set up frame with a destination IP address corresponding to that of the directory server 18 in an attempt to set up a TCP/IP connection with the directory server 18.

However, because the IP address of the directory server 18 is outside the block of private network address assigned to clients on the private network 24(*a*), the set up frame is routed to the NAT server 26(*a*). The NAT server 26(*a*), upon receipt of the set up frame, generates a translated set up frame which is sent to the directory server 18 over the Internet 12. The translated set up frame is the same as the set up frame sent by the initiating private network client 28(*aa*) except for the source address and source port number of the initiating private network client 28(*aa*) have replaced by a source address and port number corresponding to the NAT server 26(*a*).

The NAT server 26(*a*) may also maintain a translation table which maps the initiating private network client's 28(*aa*) source address and port number to the corresponding translated source address and port number. An example of a translation table which may be used by the NAT server 26(*a*) is shown in FIG. 3. Each entry 32(*a*)–32(*f*) corresponds to a frame sent by one of the clients on the private network 24(*a*) and translated by the NAT server 26(*a*) and includes data for mapping the source address and port number of a client on the private network to the translated source address and port number. As such, the NAT server 26(*a*) utilizing this exemplary translation table 30 can relay a response frame received over the Internet (on the translated address and port number) back to the initiating private network client 28(*aa*). For added security, each entry 32(*a*)–32(*f*) also may include the destination IP address and port number to which the translated frame was sent over the Internet 12. As such, the NAT server 26(*a*) is capable of verifying that a frame addressed to the translated IP address and port number is truly a response frame from the device to which the translated frame was addressed.

Upon receipt of any inbound frame from the Internet, the NAT server 26(*a*) will locate the one of the entries 32(*a*) –32(*f*) to which the frame corresponds utilizing the frames destination IP address and port number. The NAT server 26(*a*) will then verify that the inbound frame is truly a response frame by comparing the inbound frames source address and port number with the destination IP address and port number in the entry corresponding one of the entries 32(*a*)–32(*f*). If there is a match, the NAT server 26(*a*) will generate a reverse translated frame and forward the reverse translated frame to the initiating private network client 28(*aa*) on the private network 24(*a*). The reverse translated frame is the same as the response frame except the destination IP address and port number are replaced with the initiating private network client 28(*aa*) private network IP address and port number.

As such, the initiating private network client 28(*aa*) is able to establish a TCP/IP connection with the directory server 18, through the NAT server 26(*a*), to obtain the IP address of the internet client 22(*a*) which corresponds to the 10 digit telephone number associated with the internet client 22(*a*).

Thereafter, the initiating private network client 28(*aa*) is able to open a Q.931 TCP/IP connection with the terminating Internet client 22(*a*) for exchanging Q.931 messages and an H.245 connection for exchanging H.245 messages. However, even though the initiating private network client 28(*aa*) is capable of establishing TCP/IP connection with the terminating Internet client 22(*a*) and is capable of exchanging logical port numbers for UDP channels with the terminating Internet client 22(*a*), the inbound channel (e.g. the channel for sending audio data from the terminating Internet client 22(*a*) to the initiating private network client 28(*aa*)) will not work. More specifically, a UDP frame with a destination address of the private network client 28(*aa*) and port number established by the private network client 28(*aa*) for receiving UDP datagrams will not be routed to the private network client 28(*aa*) because the private network client's IP address is within a block used only on private networks and is therefore not routeable on the Internet 12. Further, if a UDP frame with a destination address of the NAT server 26(*a*) is utilized along with the port number established by the private network client 28(*aa*) is sent on the internet, it will be routed to the NAT server 26(*a*), however, the NAT server 26(*a*) will not have an entry in its translation table necessary for forwarding the frame to the private network client 28(*aa*).

Figure 4A:
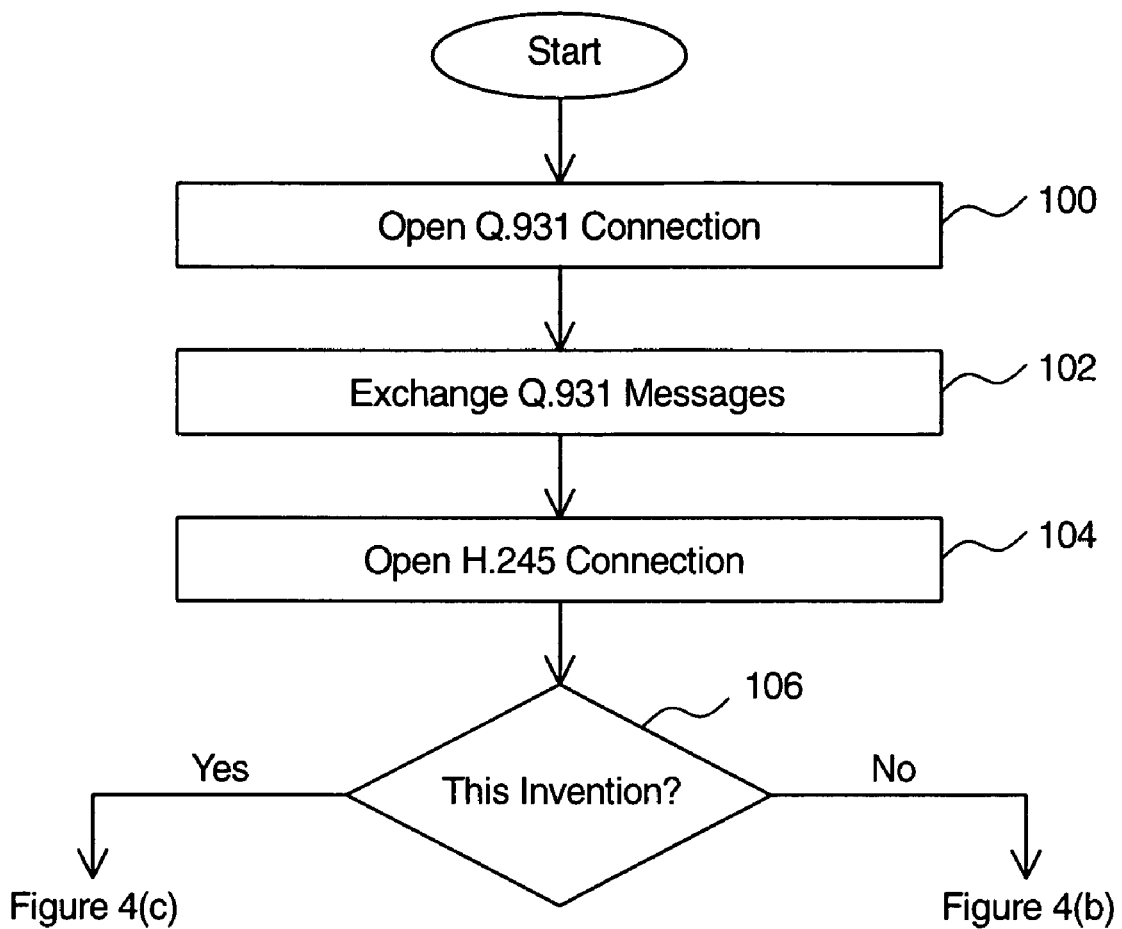
FIGS. 4a, 4b, and 4c are a flowchart representing exemplary operation of an Internet Telephony client in accordance with one aspect of this invention.
Figures 4A, 4B:
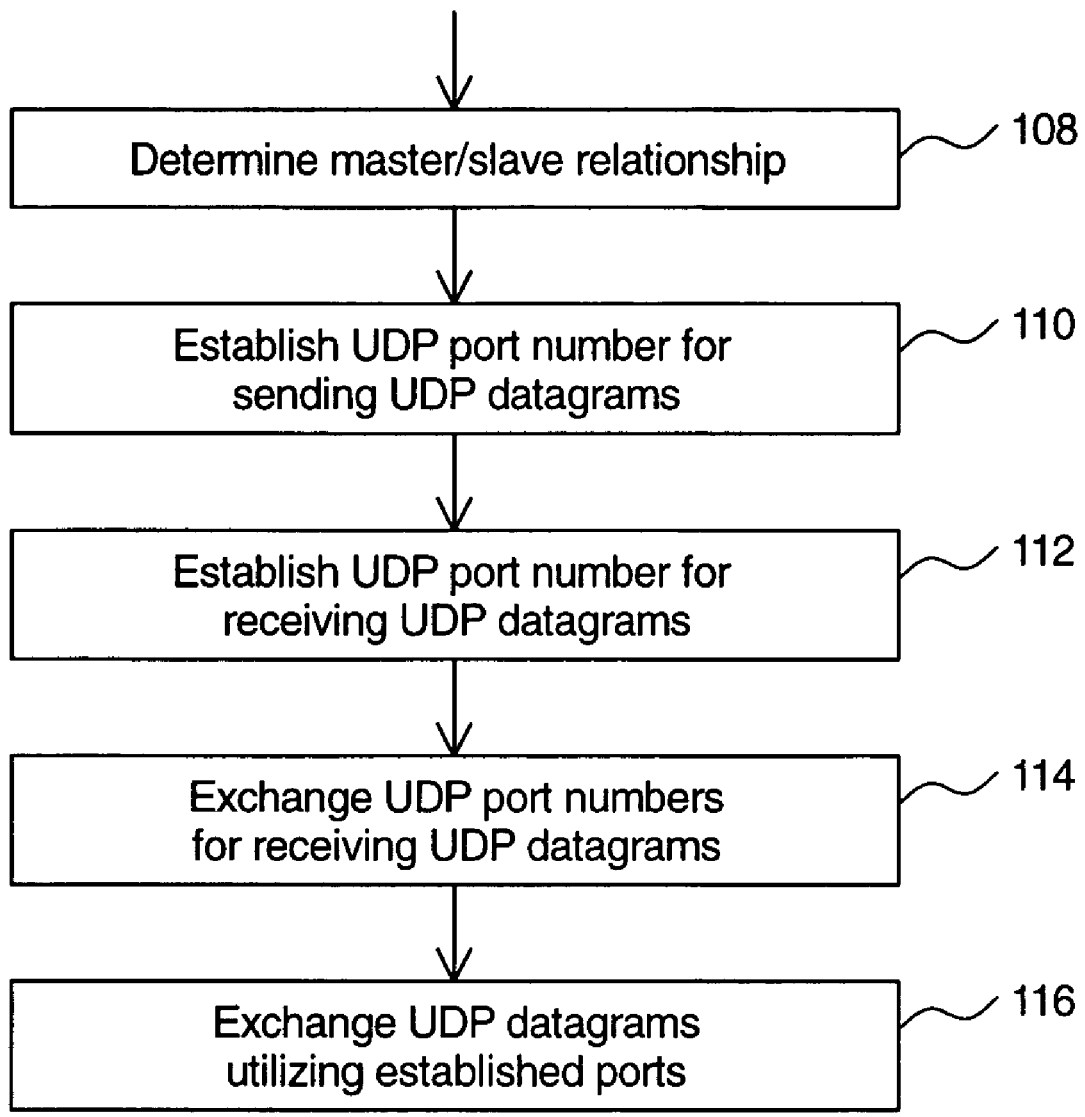
Figure 4C:
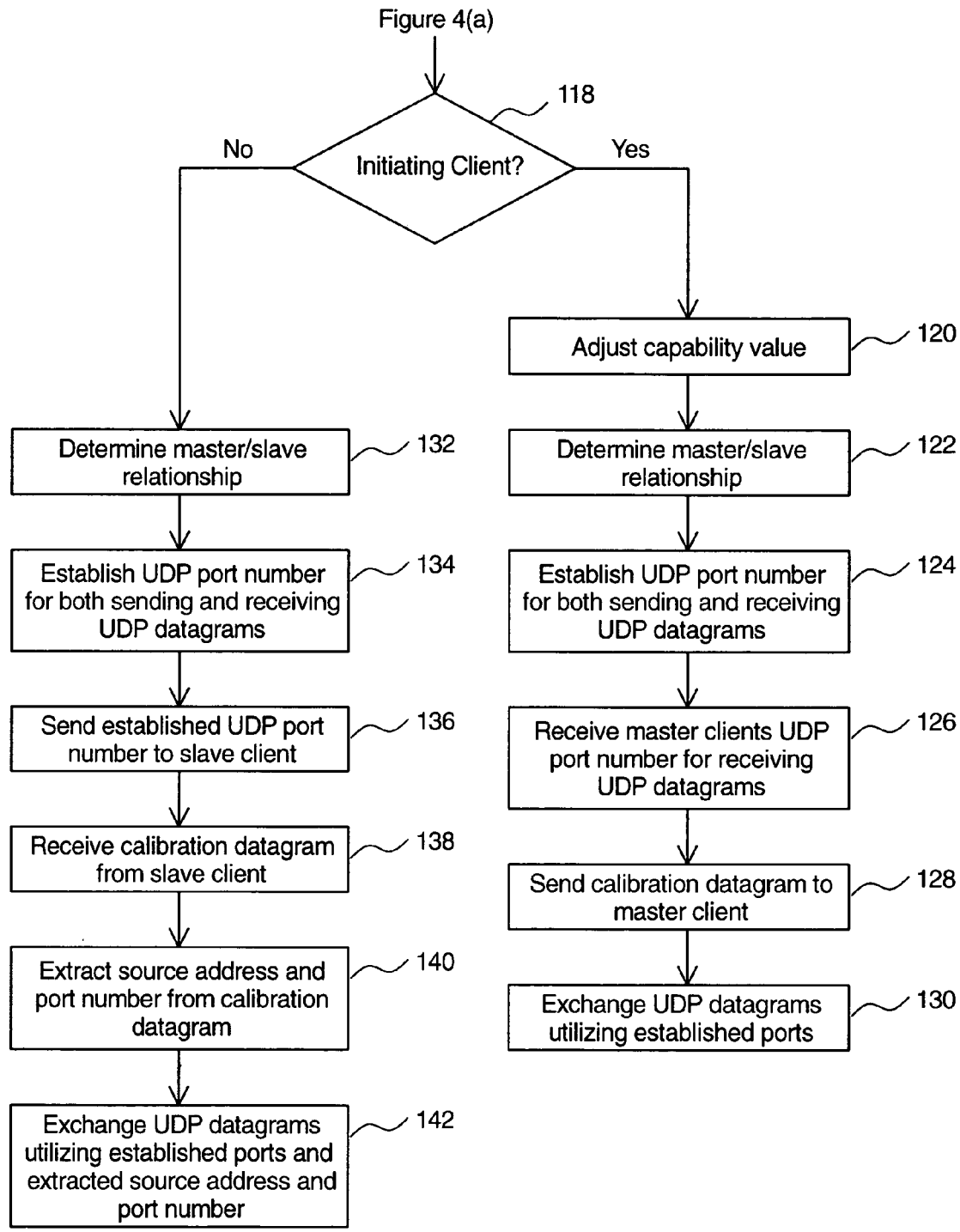

Referring to the flowchart of FIG. 4(*a*), steps performed by a telephony client operating in accordance with this invention are shown.

Step 100 represents opening a TCP/IP connection for the exchange of Q.931 messages with a remote client. In the case wherein the client operating in accordance with this invention is initiating the peer to peer internet telephony call to a remote Internet client, the step represents initiating the TCP/IP connection utilizing a well known port number for Q.931 connections. In the case wherein the client operating in accordance with this invention is receiving the peer to peer internet telephony call from a remote client, the step represents responding to the TCP/IP connection request as necessary to open the connection. As such, it should be appreciated that an initiating client may establish the TCP/IP connection with a remote Internet client even if it is behind a NAT server so long as the remote Internet client is coupled to the Internet.

Step 102 represents the exchange of various Q.931 messages over the Q.931 connection. The messages include negotiation of port numbers for the opening a TCP/IP connection for the exchange of H.245 messages and the exchange of terminal capability data. During the exchange of terminal capability data, the client operating in accordance with this invention sends a message indicating that it is capable of operating in accordance with this invention and receives, from the remote client a similar message if the remote client is also operating in accordance with this invention.

Step 104 represents opening the TCP/IP connection with the remote client for the exchange of H.245 messages. Again, in the case wherein the client operating in accordance with this invention is initiating the peer to peer internet telephony call, the client initiates the TCP/IP connection such that it may be established even if the initiating client is behind a NAT server.

Step 106 represents a decision based on whether the remote client is capable of operating in accordance with this invention. In the case where the remote client is not capable of operating in accordance with this invention, the client proceeds to the steps set forth in FIG. 4(*b*) wherein it interfaces with the remote client emulating a standard H.245 client. In the case where the remote client is also capable of operating in accordance with this invention, the client proceeds to the steps set forth in FIG. 4(*c*) wherein it interfaces with the client as set forth therein.

Turning to FIG. 4(*b*), step 108 represents determination of a Master/Slave relationship with the remote client. More specifically, terminal type values and/or random numbers are exchanged with the remote client and, based on such exchange, the client and the remote client are each assigned one of master status or slave status.

Step 110 represents the client establishing a UDP port number for sending UDP datagrams to the remote client and step 112 represents the client establishing a UDP port number for receiving UDP datagrams from the remote client.

Step 114 represent exchanging UDP port numbers for receiving UDP datagrams with the remote client. As such, after step 114, both the client and the remote client have UDP port information necessary for both sending and receiving UDP datagrams to and from the other client. Step 116 then represents the exchange of UDP datagrams, representing the Internet telephone conversation, utilizing the UDP ports as established and exchanged.

Turning to FIG. 4(*c*), which represents steps performed by the client when the remote client is determined to also be capable of operating in accordance with this invention, step 118 represents a decision based on which of the client and the remote client is the initiating client. If the client is the initiating client, it process to step 120 wherein it adjusts its terminal type value to a value which assures that it will obtain slave status when exchanging its type value utilizing standard H.245 protocols at step 122.

Step 124 represents establishing a UDP port number for both sending and receiving UDP datagrams to and from the remote (master) client and step 126 represents receiving a UDP port number from the master client on which the master client will receive UDP datagrams.

At step 128, the client sends a UDP calibration datagram to the master client utilizing the port information received from the master client at step 126. It should be appreciated that the adjustment of the terminal capability data at step 120 assures that the initiating client is the slave client, the calibration datagram may be sent to the master client even if the initiating client is behind a NAT server.

Step 130 then represents the exchange of UDP datagrams representing the Internet telephony conversation with the master client utilizing the UDP ports established and received from the master client in steps 124 and 126 respectively.

Alternatively, if at step 118, the client is not the initiating client, it proceeds to step 132 wherein a master/slave relationship is established with the remote client. During step 132, the client will be assigned master status because the remote client is the initiating client and it will have adjusted its terminal type values such that it is assigned slave status.

Step 134 represents establishing a UDP port for both sending and receiving UDP datagrams to and from the slave (remote) client and step 136 represents sending those established port numbers to the slave client.

Step 138 represents receiving a calibration datagram from the slave client and step 140 represents extracting the source address and port number from the calibration datagrams to determine the IP address and port number to uitilize as a source address and port number for sending UDP datagrams to the slave client.

In the case wherein the slave client to be behind a NAT server, the extracted source address and port number will be the translated IP address and UDP port number on the NAT server.

Thereafter, at step 142, UDP datagrams representing the Internet telephony conversation are received from the slave client utilizing the established UDP port and are sent to the slave client utilizing the extracted IP address and port number.

It should be appreciated that because the UDP datgrams are 1) being sent from the same IP address and port number which the calibration datagram was sent to; and 2) being sent to the same IP address (NAT IP address) and port number (NAT port number) that the calibration datagram was sent from, a typical NAT server will forward such UDP datagrams to the slave client on the private network.

More specifically, wherein the initiating (slave) client is a private network client, the initiating private network client will be capable of sending the calibration datagram to the terminating (master) client through its associated NAT server. The NAT server will translate both the source address and port number of the calibration datagram and set up an entry in the translation table. Thereafter, when the NAT server receives a datagram on the translated IP address and port number (e.g. response datagram) the destination address and port number of the response datagram will match a translation table entry and the NAT server will perform the reverse translation to relay the UDP datagram back to the initiating (slave) private network client.

It should be appreciated that the Internet audio communication system of this invention provides for the ability to establish and maintain Internet telephony calls from a private network behind a NAT server. Additionally, although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A method of audio communication between a first and second telephony clients through a packet switched network, the method comprising:
   a) establishing a reliable call set up connection between the first telephony client located on a private network and the second telephony client on the Internet;
   b) utilizing the reliable call set up connection to establish an outbound audio data channel between the first telephony client and the second telephony client;
   c) sending an outbound datagram from the first telephony client to the second telephony client utilizing the outbound audio data channel; and
   d) utilizing the outbound datagram sent on the audio data channel from the first telephony device to the second telephony device to identify a reverse audio data channel for sending an inbound datagram from the second telephony device to the first telephony device.

2. The method of claim 1, further including sending a plurality of datagrams representing audio data from the first telephony client to the second telephony client utilizing the outbound audio data channel and sending a plurality of datagrams representing audio data from the second telephony client to the first telephony client utilizing the reverse audio data channel.

3. The method of claim 2, wherein the outbound audio data channel is defined by an IP address and logical port number associated with the second telephony client for receiving user datagram protocol (UDP) datagrams.

4. The method of claim 3, wherein the step of sending the outbound datagram from the first telephony client to the second telephony client utilizing the outbound audio data channel includes:
   i) sending a private network outbound datagram with a source address and port number configured to a private network IP address and logical port number associated with the first telephony client for sending UDP datagrams and a destination address and port number configured to the IP address and logical port number associated with the second telephony client for receiving UDP datagrams;
   ii) routing the private network outbound datagram to a network address translation device;
   iii) translating the source address and port number from the private network IP address and logical port number associated with the first telephony device to an IP address and logical port number associated with the translation device; and
   iv) sending an Internet outbound datagram with a source address and port number configured to the translated source address and port number and a destination address and port number configured to the IP address and logical port number associated with the second telephony client for receiving UDP datagrams.

5. The method of claim 4, further including storing data representing the translation between the private network IP address and logical port number associated with the first telephony client and the IP address and logical port number associated with the translation device in a translation table.

6. The method of claim 5, wherein the step of utilizing the outbound datagram sent on the audio data channel from the first telephony client to the second telephony client to identify an reverse audio data channel for sending an inbound datagram from the second telephony client to the first telephony client includes extracting the source address and logical port number from the Internet outbound datagram.

7. The method of claim 6, wherein the step of sending a plurality of datagrams representing audio data from the second telephony client to the first telephony client utilizing the reverse audio data channel includes:
   i) sending an Internet inbound datagram with a destination address and port number configured to the IP address and logical port number associated with the translation device;
   ii) receiving the Internet inbound datagram at the translation device and utilizing the translation table to map the destination address and port number of the Internet inbound datagram to the private network IP address and port number associated with the first telephony client; and
   iii) sending a private network inbound datagram with a destination address and port number configured to the private network IP address and port number associated with the first telephony client.

8. A method of audio communication in an initiating telephony client for communicating audio data with a terminating telephony client through a packet switched network, the method comprising:
   a) establishing a reliable call set up connection with the terminating telephony client;
   b) receiving data from the terminating telephony client, utilizing the reliable call set up connection, representing a logical port number on which the terminating telephony client will receive user datagram protocol (UDP) datagrams;
   c) configuring a logical port for both sending and receiving UDP datagrams to the terminating telephony client;
   d) sending a UDP calibration datagram to the terminating telephony client utilizing a destination port number configured to the logical port number on which the terminating telephony device will receive UDP datagrams and a source port number configured to the logical port for both sending and receiving UDP datagrams; and
   e) sending and receiving UDP datagrams representing an Internet telephony conversation on the logical port configured for both sending and receiving UDP datagrams.

9. A method of audio communication in a terminating telephony client for communicating audio data with an initiating telephony client through a packet switched network, the method comprising:
   a) establishing a reliable call set up connection with the initiating telephony client;
   b) configuring a logical port number for both sending and receiving (UDP) datagrams;
   c) sending data to the initiating telephony client, utilizing the reliable call set up connection, representing the logical port number configured for receiving UDP datagrams;
   d) receiving a UDP calibration datagram from the initiating telephony client on the logical port number configured for receiving UDP datagrams;

e) extracting a source port number from the calibration datagram to determine a destination logical port number for use in sending UDP datagrams to the initiating telephony client; and f) sending a UDP datagram to the initiating telephony client utilizing the destination logical port number as the destination port and utilizing the port configured for both sending and receiving UDP datagrams as a source port.

10. The method of claim 9, further including extracting a source IP address from the calibration datagram to determined an IP address for use in sending UDP datagrams to the initiating telephony client.

11. The method of claim 10, further including exchanging a plurality of UDP datagrams representing audio data with the initiating telephony client on a UDP channel defined by the IP address and port number extracted from the calibration datagram and an IP address of the terminating telephony client and logical port number configured for both sending and receiving UDP datagrams.

12. A method of establishing an Internet telephony session and communicating audio data between a client and a remote client; the method comprising:

a) establishing a reliable call set up connection with the remote client;

b) determining which one of the remote client and the client initiated the Internet telephony session;

c) assigning a first status to the one of the remote client and client determined to have initiated the Internet telephony session;

d) assigning a second status to the one of the remote client and client not assigned a first status;

e) sending data representing a logical port configured for receiving user datagram protocol (UDP) datagrams from the one of the remote client and the client assigned the second status to the one of the remote client and the client assigned the first status;

f) sending a calibration datagram to the logical port configured for receiving UDP datagrams from the one of the remote client and the client assigned the first status to the one of the remote client and the client assigned the second status; and g) utilizing the calibration datagram to identify a logical port number associated with the one of the remote client and the client assigned the first status for use sending UDP datagrams from the one of the remote client and the client assigned the second status to the one of the remote client and the client assigned the first status.

13. The method of claim 12, wherein the step of sending the calibration datagram includes:

i) sending a private network outbound datagram with a source address and port number configured to a private network IP address of the one of the client and remote client assigned the first status and a logical port number configured for both sending and receiving UDP datagrams;

ii) routing the private network outbound datagram to a network address translation device;

iii) translating the source address and port number to an IP address and logical port number associated with the translation device; and iv) sending an Internet outbound datagram with a source address and port number configured to the translated source address and port number to the one of the client and the remote client assigned the second status.

14. The method of claim 13, further including storing data representing the translation between the source address and port number of the private network outbound datagram and the translated source address and port number of the Internet outbound datagram in a translation table.

15. The method of claim 14, wherein the step of utilizing the calibration datagram to identify a logical port number associated with the one of the remote client and the client assigned the first status for use sending UDP datagrams from the one of the remote client and the client assigned the second status to the one of the remote client and the client assigned the first status includes extracting the translated source address and logical port number from the Internet outbound datagram.

* * * * *